United States Patent [19]

O'Hara

[11] 3,998,721
[45] Dec. 21, 1976

[54] HYDROCARBONACEOUS BLACK OIL CONVERSION PROCESS

[75] Inventor: Mark J. O'Hara, Mount Prospect, Ill.

[73] Assignee: UOP Inc., Des Plaines, Ill.

[22] Filed: July 28, 1975

[21] Appl. No.: 599,520

Related U.S. Application Data

[63] Continuation-in-part of Ser. No. 428,562, Dec. 26, 1973, Pat. No. 3,909,453.

[52] U.S. Cl. .............................. 208/111; 208/112; 208/216; 208/264; 252/458; 252/465; 252/455 R
[51] Int. Cl.$^2$ .................. C10G 13/02; B01J 23/16
[58] Field of Search ........................... 208/111, 264

[56] References Cited
UNITED STATES PATENTS 3,304,254   2/1967   Eastwood et al. ............... 208/111

Primary Examiner—Delbert E. Gantz
Assistant Examiner—G. E. Schmitkons
Attorney, Agent, or Firm—James R. Hoatson, Jr.; Thomas K. McBride; William H. Page, II

[57] ABSTRACT

An improved method of preparing a catalyst comprising a Group VIII metal and a Group VIB metal impregnated on a refractory inorganic oxide support or carrier material, said catalyst being especially useful in the hydrorefining of residual oils, and particularly effective for the conversion of sulfurous components contained therein. A more active catalyst results from the order of metals impregnation on the support or carrier material, and from the nature of the impregnating solution.

7 Claims, No Drawings

HYDROCARBONACEOUS BLACK OIL CONVERSION PROCESS

CROSS REFERENCE TO RELATED APPLICATION

The present application is a continuation-in-part of my copending application, Ser. No. 428,562, filed Dec. 26, 1973, (now U.S. Pat. No. 3,909,453), all the teachings of which are incorporated herein by specific reference thereto.

This invention relates to a method of manufacturing a catalyst particularly adapted to the hydrorefining of residual oils. Residual oils are the liquid or semi-liquid products recovered as a non-distillable bottoms fraction or residue in the distillation of petroleum. The residual oils are highly carbonaceous refractory materials variously referred to as asphaltum oil, liquid asphalt, black oil, petroleum tailings, residuum, residual reduced crude, vacuum bottoms, and the like. In general, the hydrorefining or hydrotreating of residual oils is designed for the conversion of $C_7$-insoluble asphaltenes and other hydrocarbonaceous matter to more valuable distillable petroleum products, and/or conversion and separation of sulfurous components to render the residual oil useful, for example, as a fuel oil. Catalysts comprising a Group VIII metal and a Group VIB metal, preferably impregnated on an alumina or alumina-silica carrier material, have received art recognition for their capacity to convert $C_7$-insoluble asphaltenes as well as sulfurous compounds in residual oils at hydrorefining conditions.

It is an object of this invention to present an improved method of manufacturing a catalyst comprising a Group VIII and a Group VIB metal component impregnated on a refractory inorganic oxide support or carrier material, said improvement resulting in a catalyst of improved activity, particularly with respect to the conversion of sulfurous components contained in a residual oil.

In one of its broad aspects, the present invention embodies an improvement in the manufacture of a catalyst comprising a Group VIII metal and a Group VIB metal impregnated on a refractory inorganic oxide carrier material, the improvement comprising (a) initially impregnating the refractory inorganic oxide carrier material with an aqueous solution of a Group VIII metal compound; (b) drying the impregnated carrier material to contain less than about 50 wt. % volatile matter as determined by weight loss on ignition at 500° C.; (c) further impregnating the Group VIII metal compound-containing carrier material with an ammoniacal solution of a Group VIB metal compound; and (d) drying the resulting composite and calcining the same in an oxidizing atmosphere at a temperature of from about 500° to about 700° C.

Other objects and embodiments of this invention will become apparent in the following detailed specification.

The refractory inorganic oxides generally employed as a support or carrier material include alumina, silica, zirconia, boria, thoria, etc., or combinations thereof, particularly alumina in combination with one or more refractory inorganic oxides. Alumina composited with silica in a weight ratio of from about 1.5:1 to about 9:1, preferably from about 3:1 to about 9:1, is a particularly suitable refractory inorganic oxide and the further description of the method of manufacture of this invention is presented with reference thereto.

Many methods are known for preparing the preferred alumina-silica composite. The simplest and most widely practiced methods involve the precipitation of one of the components, alumina or silica, from a sol as a gel, said gel being thereafter impregnated with a solution of a suitable gel precursor of the other component which is thereafter precipitated to form an alumina-silica cogel, or alternatively, both components, alumina and silica, may be coprecipitated from a common sol. In the latter case, it is most convenient to prepare an acidic silica sol and an alumina sol and then commingle the sols in the desired proportions. Alumina-silica composites comprising alumina in at least an equimolar amount with silica are especially well prepared by this last described method.

Several alternative procedures are available for preparing an acidic silica sol. In one method, a mineral acid such as hydrochloric acid, sulfuric acid, or nitric acid is added to an aqueous solution of an alkali metal silicate, sodium silicate being preferred because of its low cost and general availability. In a second method, the order of addition is reversed, the water glass being added to the acid. The latter technique is preferred since the formation of the silica sol always occurs under acid conditions and there is no danger of the sol prematurely solidifying as is the case in the former method when the pH of the system is reduced from a high value to a low value. When using hydrochloric or sulfuric acid, concentrations thereof of from about 10% to about 30% are satisfactory. The water glass solution may be prepared from commercial sodium silicates, such as Philadelphia Quartz Company, brands E, M, N, or S. The commercial water glass is first diluted with water to reduce the silica concentration thereof to about 5-15 wt. %. The commingling of acid and water glass is preferably carried out with agitation and at a temperature below about 35° C. The pH of the acidic sol at this stage will be in the range of about 1.5-2. If desired, the silica sol may be aged at this pH for a period of 0.1-1 hour or more.

While an alumina sol precursor, such as an aqueous solution of aluminum sulfate, aluminum chloride or aluminum nitrate may be commingled with the silica sol, it is preferable to employ a true alumina sol. One method of preparing an alumina sol is in the electrolysis of an aluminum salt solution, such as an aqueous aluminum chloride solution, in an electrolytic cell having a porous partition between the anode and cathode whereby an acid anion deficient aluminum salt solution, or sol, is recovered from the cathode compartment. Preferably, the alumina sol is an aluminum chloride sol prepared by treating an excess of aluminum particles in aqueous hydrochloric acid and/or aluminum chloride solution, usually at about reflux temperature, until a quantity of aluminum has been digested sufficient to form a sol of a predetermined aluminum/chloride ratio which influences the pore volume and pore diameter characteristics of the alumina-silica composite as hereinafter related.

The separately formulated silica and alumina sols are then blended to yield an acidic hydrosol of alumina and silica. The alumina sol may be added to the silica sol, or the silica sol may be added to the alumina sol or both sols may be continuously admixed with an in-line blender. The mixing should be done with agitation and with water addition, if necessary, to prevent premature gelation at this point, since the blended sol is undergoing some polymerization as viscosity increases.

In the present invention, a preferred method of preparing the alumina-silica component relates to the cogelation of an alumina sol and a silica sol to form spherical gel particles utilizing the well-known oil drop method. Thus, an alumina sol, suitably prepared by digesting aluminum pellets in aqueous hydrochloric acid solution, is commingled with a silica sol, suitably prepared by the acidification of water glass as is commonly practiced, and the sol blend dispersed as droplets in a hot oil bath whereby gelation occurs with the formation of spheroidal particles. In this type of operation, the silica is set thermally, the alumina being set chemically utilizing ammonia as a neutralizing or setting agent. Usually the ammonia is furnished by an ammonia precursor which is included in the sol. The ammonia precursor is suitably urea, hexamethylenetetramine, or mixtures thereof. Only a fraction of the ammonia precursor is hydrolyzed or decomposed in the relatively short period during which initial gelation occurs. During the subsequent aging process, the residual ammonia precursor retained in the spheroidal gel particles continues to hydrolyze and effect further polymerization of the alumina-silica whereby the pore characteristics of the composite are established. The alumina-silica particles are aged, usually for a period of from about 10 to about 24 hours at a predetermined temperature, usually from about 50° to about 105° C. and at a predetermined pH value. The aging time is substantially reduced utilizing pressure aging techniques. With alumina-silica ratios in the higher range, pressure aging tends to lower the bulk density.

As previously stated, and as heretofore disclosed in the art, the foregoing method affords a convenient means of developing desired physical characteristics of the carrier material. Thus, one skilled in the art will appreciate that in general the aluminum/chloride ratio of the alumina sol will influence the average bulk density of the alumina-silica product and, correspondingly, the pore volume — pore diameter characteristics attendant therewith, lower ratios tending toward higher average bulk densities. Other process variables effecting the physical properties of the carrier material include the time, temperature and pH at which the particles are aged. Usually, temperatures in the lower range and shorter aging periods tend toward higher average bulk densities.

In any case, the refractory inorganic oxide is dried and calcined prior to impregnation with the Group VIII and Group VIB metal components. Calcination is suitably accomplished on heating the carrier material in an oxygen-containing atmosphere, such as air, at a temperature increasing from about 125° to about 600° C. over a period of from about 30 to about 90 minutes, and thereafter at a temperature of from about 600° to about 800° C. for at least about 30 minutes and not necessarily in excess of about 8 hours.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that, upon subsequent heating of the impregnated carrier material at a temperature effecting decomposition of said compound, the desired metallic component is formed deposited and dispersed on the carrier material.

The hydrorefining catalyst of this invention is prepared to contain metallic components comprising a metal of Group VIII and Group VIB. The present invention is based on the discovery that a hydrorefining catalyst of increased activity, particularly with respect to desulfurization, is produced when the carrier material is first impregnated with an aqueous solution of a Group VIII metal compound, and thereafter with an ammoniacal solution of a Group VIB metal compound with intermediate drying as hereinafter described. Thus, in accordance with the method of the present invention, the carrier material is initially impregnated with an aqueous solution of a soluble compound of iron, nickel, cobalt, platinum, palladium, ruthenium, rhodium, osmium and/or iridium. Suitable soluble compounds of the Group VIII metals include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum fluoride, chloroplatinic acid, chloropalladic acid, palladium fluoride, etc. The Group VIII metal component which is preferably nickel, is effective in an amount comprising from about 0.1 to about 10 wt. % of the final catalyst composite, and the concentration of the selected Group VIII metal compound in the aqueous impregnating solution is sufficient to provide a desired amount of the Group VIII metal within the given range.

Impregnation of the support or carrier material can be accomplished by conventional techniques whereby the carrier material is soaked, dipped, suspended or otherwise immersed in the impregnating solution at conditions to adsorb a soluble compound comprising the desired catalytic component. Certain impregnating techniques have been found to be particularly favorable to promote desired physical properties of the finished catalyst. Thus, impregnation of the Group VIII metal component is preferably effected utilizing a minimal volume of impregnating solution commensurate with an even distribution of the catalytic component on the carrier material. One preferred method involves the use of a steam-jacketed rotary dryer. The carrier material is immersed in the impregnating solution contained in the dryer and the carrier material tumbled therein by the rotating motion of the dryer, the volume of the carrier material so treated being initially in the range of about 0.7 to about 1.0 with respect to the volume of impregnating solution. Evaporation of the solution in contact with the carrier material is expedited by applying steam to the dryer jacket. The evaporation is further facilitated by a continuous purge of the dryer utilizing a flow gas, suitably air or nitrogen. In any case, the impregnating solution is evaporated at conditions to reduce the volatile matter of the impregnated carrier material to less than about 50 wt. % as determined by weight loss on ignition at 500° C.

Pursuant to the present invention, the Group VIII metal compound-containing carrier material is subsequently further impregnated with an ammoniacal solution of a Group VIB metal compound. Of the Group VIB metals, i.e., molybdenum, chromium, and tungsten, molybdenum is a preferred Group VIB metal component. Suitable Group VIB metal compounds for use herein included ammonium molybdate, ammonium paramolybdate, molybdic acid, ammonium chromate, ammonium peroxychromate, chromium acetate, chromous chloride, chromium nitrate, ammonium metatungstate, tungstic acid, and the like. The Group VIB metal compound is prepared in ammoniacal solution in sufficient concentration to provide from about 5 to about 20 wt. % Group VIB metal on the final catalyst composite. The Group VIB metal compound can be impregnated on the Group VIII metal compound-containing carrier material substantially as heretofore described, and the impregnated carrier material hereafter calcined in an oxygen-containing atmosphere at a temperature of from about 425° to about 815° C. in accordance with prior art practice, usually for a period of from about 1 to about 8 hours or more.

Hydrorefining, particularly directed to the conversion of sulfurous compounds in a residual oil, is generally effected at reaction conditions including an imposed hydrogen pressure of from about 100 to about 1000 psi. Normally, the hydrogen is charged together with recycle hydrogen to provide from about 1000 to about 5000 standard cubic feet per barrel of hydrocarbon charge. Reaction conditions further include an elevated temperature, usually from about 95° to about 425° C., although temperatures in the higher range, say from about 315° to about 425° C. are most suitable. Also, the sulfur-containing residual oil is suitably processed at a liquid hourly space velocity of from about 1.0 to about 20.

The following examples are presented in illustration of the method of catalyst preparation of this invention and are not intended as an undue limitation on the generally broad scope of the invention as set out in the appended claims.

The activity of the catalyst prepared in accordance with the method of this invention was determined relative to the activity of a standard or reference catalyst. The relative activity of the catalyst was determined with respect to desulfurization of a vacuum tower bottoms feed stock, as a function of liquid hourly space velocity (LHSV). The vacuum tower bottoms feed stock had an API at 60° F. of 9.6, and contained 0.32 wt. % nitrogen, 3.25 wt. % sulfur and 4.7 wt. % heptane-insoluble asphaltenes. The feed stock further contained 10.52 wt. % hydrogen, and 73.5 wt. % was recovered as bottoms after vacuum Engler distillation.

In the relative activity test, 150 cubic centimeters of the catalyst to be evaluated is disposed in a ⅞ inch I.D. vertical tubular reactor as a fixed bed comprising alternating layers of 10 cubic centimeters of catalyst and 2 cubic centimeters of 60–80 mesh sand, the catalyst bed being preceded by a quartz chip preheat section. The reactor is pressured to 3000 psig with hydrogen, and the hydrogen is recycled over the catalyst at the rate of 15,000 SCF/BBL (based on a 1.0 LHSV hydrogen charge rate) while the catalyst inlet temperature is raised to 260° C. The vacuum tower bottoms feed stock is charged to the reactor at 1.0 LSHV for two hours after which the catalyst inlet temperature is raised at the rate of 30°/hr. to a temperature of 380° C. After a 27 hour line-out period, the liquid product effluent is collected over an 8 hour test period. The charge rate is thereafter reduced to 0.5 LHSV and, after an 8 hour line-out period, the liquid product effluent is again collected over an 8 hour test period. In each test period, the liquid product effluent is analyzed for sulfur.

The analytical results are plotted on a semi-logarithmic scale as a function of the LHSV employed. The slope of the resulting straight line is then utilized to determine the activity of the test catalyst relative to the standard or reference catalyst, the ratio of the slope from the test catalyst to that of the standard or reference catalyst (multiplied by a factor of 100) being the relative activity of the test catalyst.

The standard or reference catalyst employed herein consists of 2 wt. % nickel, and 16 % molybdenum on an alumina-silica carrier material comprising 88 wt. % alumina and 12 wt. % silica. In the preparation of the standard or reference catalyst, about 850 grams of an alumina sol, prepared by digesting 122 grams of aluminum in hydrochloric acid, was commingled with 7.1 cubic centimeters of concentrated hydrochloric acid to adjust the Al/Cl ratio to 1.3. The alumina sol was then admixed with 350 grams of an 18.4% aqueous hexamethylenetetramine solution sufficient to effect 180% neutralization of the free chloride in the sol upon total decomposition. The alumina sol was thereafter blended with a silica sol prepared by the acidification of 139 cubic centimeters of an aqueous water glass solution (18.5% $SiO_2$) with about 88 cubic centimeters of 50% hydrochloric acid, the Cl/Na ratio of the silica sol being 1.3. The sol blend was then dispersed as droplets in an oil bath at about 98° C. and formed into spherical gel particles. The spherical gel particles were aged in the hot oil bath for about 18 hours and thereafter for about 4 hours in a 3% aqueous ammonia solution at about 98° C. The spheres were then washed with about 19 liters of water containing 25 milliliters of a 28% aqueous ammonia solution and 15 milliliters of a 20% ammonium nitrate solution.

The alumina-silica spheres were dried in an oven at 125° C. until the volatile matter was reduced to about 26.5 wt. % as evidenced by weight loss upon ignition at 500° C. The dried spheres were charged to a muffle furnace at 125° C. and calcined in an air atmosphere at a temperature increasing from 125° to about 600° C. over a one-hour period. The spheres were then further calcined in the air atmosphere at 600° C. for about 1 hour. The calcined product had a surface area of about 323 $m^2$/gm, an average pore diameter of about 78 Angstroms and an average pore volume of about 0.63 cc/gm.

Impregnation of the spheres was effected by treating the spheres with an aqueous solution of molybdic acid and nickel nitrate in a rotary steam dryer. The aqueous solution was prepared by commingling an aqueous solution of 38.5 grams of 85% grams molybdic acid and 23 milliliters of ammonium hydroxide with an aqueous solution of 13.5 grams of nickel nitrate hexahydrate and 12 milliliters of ammonium hydroxide, the resulting solution being diluted to 170 milliliters with water. One hundred grams of the dried and calcined alumina-silica spheres were immersed in the impregnating solution which was then evaporated to dryness with an additional hour of drying at 120° C. in a drying oven. The spheres were then dried in air at 400° C. for 1 hour and thereafter calcined in air at 595° C. for 3 hours.

Alumina-silica spheres, prepared substantially as described with respect to the standard or reference catalyst, were impregnated with an aqueous nickel nitrate solution utilizing a rotary steam dryer. The aqueous solution was prepared by dissolving 13.5 grams of nickel nitrate hexahydrate in 170 milliliters of water. One hundred grams of the spheres were immersed in the impregnating solution, and the solution was evaporated until the spheres were free-flowing in the rotary dryer and exhibited about a 26% weight loss on ignition at 500° C. The spheres were thereafter impregnated with an ammoniacal impregnating solution of the molybdic acid. The ammoniacal solution was prepared by dissolving 38.5 grams of 85% molybdic acid and 23 milliliters of ammonium hydroxide in about 170 milliliters of water. The spheres were immersed in the solution in a rotary steam dryer and the solution evaporated to dryness. The impregnated spheres were then dried at 400° C. for about 1 hour in air and thereafter calcined in air for 3 hours at 595° C. When evaluated pursuant to the described relative activity test, the catalyst had a relative activity of 161. When the same two step impregnation was carried out except that in the second step aqueous ammonium molybdate was used, a relative activity of only 88 was obtained.

I claim as my invention:

1. A process for the conversion of an asphaltene-containing hydrocarbonaceous charge stock which comprises reacting said charge stock and hyrdrogen in contact with a catalytic composite comprising a Group VIII metal and a Group VIB metal impregnated on a refractory inorganic oxide carrier material wherein said composite is prepared in a manner which comprises:
   a. initially impregnating the refractory inorganic oxide carrier with an aqueous solution of a Group VIII metal compound;
   b. drying the impregnated carrier material to contain less than about 50 wt. % volatile matter as determined by weight loss on ignition at 500° C.;
   c. further impregnating the Group VIII metal compound-containing carrier material with molybdic acid dissolved in aqueous ammonium hydroxide; and
   d. drying the resulting composite and calcining the same in an oxidizing atmosphere at a temperature of from about 500° to about 700° C.

2. The process of claim 1 further characterized in that said refractory inorganic oxide is a composite of alumina and silica.

3. The process of claim 1 further characterized in that said refractory inorganic oxide is alumina composited with silica in a weight ratio of from about 3:1 to about 9:1.

4. The process of claim 1 further characterized in that said Group VIII metal compound is used in sufficient concentration in said aqueous solution to provide a final catalyst containing from about 0.1 to about 10 wt. % Group VIII metal.

5. The process of claim 1 further characterized in that said molybdic acid is used in sufficient concentration in said aqueous ammonium hydroxide to provide a final catalyst containing from about 5 to about 20 wt. % molybdenum.

6. The process of claim 1 further characterized in that said Group VIII metal compound is a compound of nickel.

7. The process of claim 1 further characterized in that said Group VIII metal compound is nickel nitrate.

* * * * *